United States Patent [19]

Barbier

[11] Patent Number: 5,090,971
[45] Date of Patent: Feb. 25, 1992

[54] PROCESS AND APPARATUS FOR GAS TREATMENT OF A PRODUCT

[75] Inventor: Francois-Xavier Barbier, Hinsdale, Ill.

[73] Assignee: L'Air Liquide, Societe Anonyme Pour L'Etude et L'Exploitation des Procedes Georges Claude, Paris, France

[21] Appl. No.: 565,421

[22] Filed: Aug. 10, 1990

[30] Foreign Application Priority Data

Aug. 16, 1989 [FR] France ............................ 8910914

[51] Int. Cl.$^5$ ...................... B01D 53/22; B01D 53/04
[52] U.S. Cl. ........................................ 55/16; 55/26; 55/46; 55/47; 55/51
[58] Field of Search ............... 55/16, 25, 26, 46, 47, 55/51, 158, 179, 180, 387, 389

[56] References Cited

U.S. PATENT DOCUMENTS

| | | | |
|---|---|---|---|
| 3,113,871 | 12/1963 | Webster | 99/155 |
| 3,690,040 | 9/1972 | Halfon | 55/46 |
| 3,961,917 | 6/1976 | Benedict et al. | 55/16 |
| 4,017,276 | 4/1977 | Bloem | 55/51 |
| 4,444,571 | 4/1984 | Matson | 55/51 X |
| 4,494,966 | 1/1985 | Umeki | 55/26 |
| 4,675,030 | 6/1987 | Czarnecki et al. | 55/16 |
| 4,690,695 | 9/1987 | Doshi | 55/16 |
| 4,690,696 | 9/1987 | Sircar et al. | 55/26 |
| 4,701,187 | 10/1987 | Choe et al. | 55/16 |
| 4,752,306 | 6/1988 | Henriksen | 55/51 X |
| 4,863,492 | 9/1989 | Doshi et al. | 55/25 X |

FOREIGN PATENT DOCUMENTS

| | | | |
|---|---|---|---|
| 0234771 | 9/1987 | European Pat. Off. | |
| 0294036 | 12/1988 | European Pat. Off. | 55/25 |
| 0335418 | 10/1989 | European Pat. Off. | 55/25 |
| 1156417 | 6/1969 | United Kingdom | |
| 2038199 | 7/1980 | United Kingdom | 55/25 |
| 2127711 | 4/1984 | United Kingdom | 55/47 |

Primary Examiner—Robert Spitzer

[57] ABSTRACT

Process for the gas treatment of a product in a confined treatment zone by a flow of an inert gas, such as nitrogen, wherein a gas flow which originates from a gas treatment containing a high proportion of nitrogen, becomes loaded with impurities such as: oxygen, and/or carbon dioxide, and/or water, and wherein the flow of gas which originates from the treatment undergoes at least substantially in part, a removal of the impurities in a separator of the adsorption or permeation type before being recycled as treatment gas, with addition of a compensating gas flow predominantly containing nitrogen. Application for example to the deoxygenation of liquids, in particular nutritious liquids, to the providing of inert conditions in ovens or storage enclosures for products such as electronic pieces, or in chambers used for preserving nutritious products in an atmosphere which is substantially free from oxygen.

8 Claims, 1 Drawing Sheet

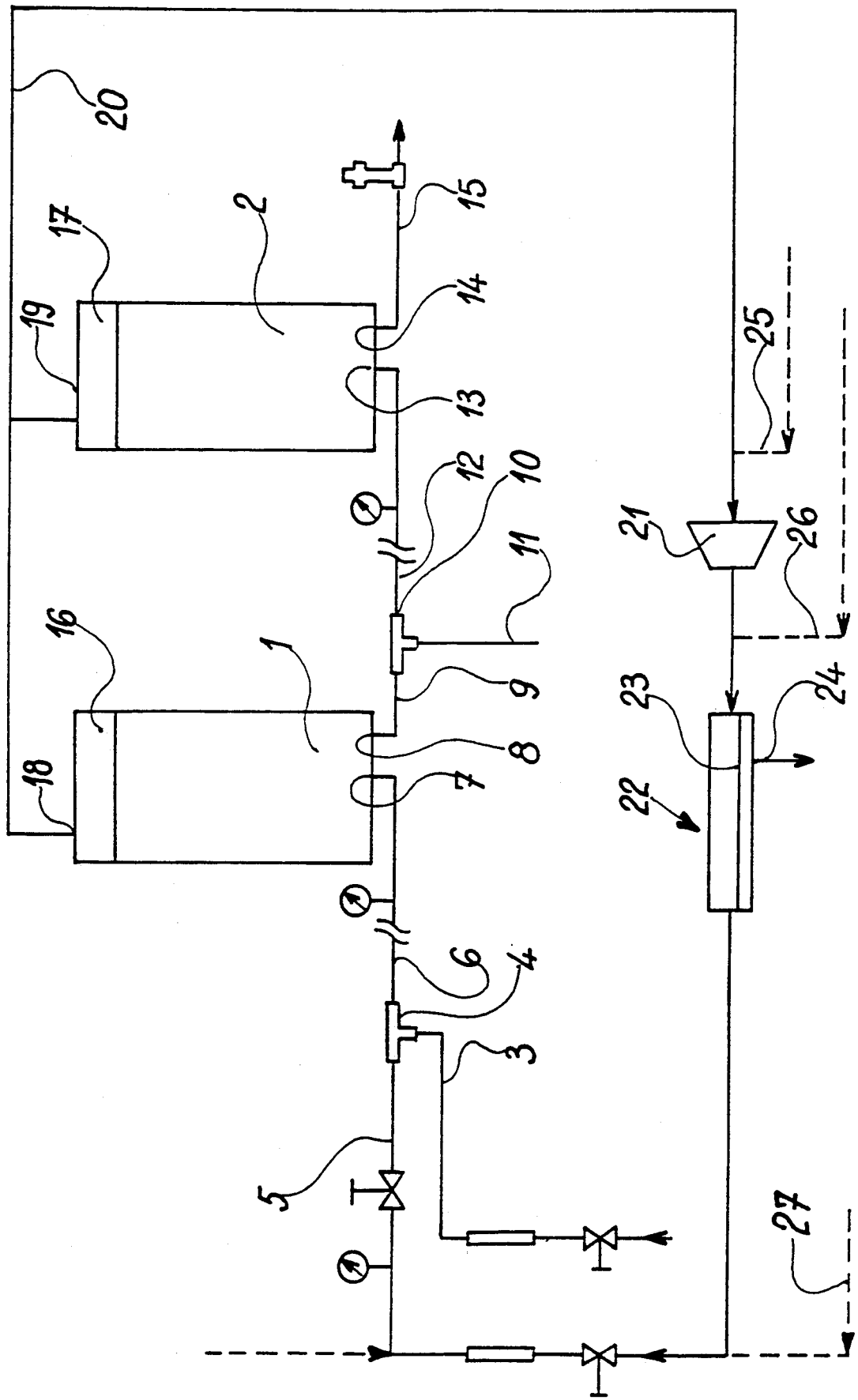

PROCESS AND APPARATUS FOR GAS TREATMENT OF A PRODUCT

BACKGROUND OF INVENTION (a) Field of the Invention

The invention concerns a process for the gas treatment of a product in a confined treatment zone.

(b) Description of Prior Art

An example of such a treatment is the deoxygenation of a nutritious liquid. As a matter of fact, in this type of applications, the presence of oxygen often limits the time of preservation of the products since oxygen produces phenomenona of aerobic fermentation, or phenomena of oxidation of the components which are responsible for the modification of the organoleptic properties of the product (aroma, taste). Now, all the nutritious liquids contain dissolved oxygen when they are placed in contact with ambient air, the quantity of dissolved oxygen being proportional to the partial pressure of oxygen at the surface of the liquid, and varies as a function of temperature, pressure and composition of the liquid.

Therefore, to avoid these phenomenona, the liquids which take part in food processing are currently treated:
  either by deoxygenation of water used for diluting beer manufactured by the so-called high density process,
  or by deoxygenation of fruit juices.

Deoxygenation generally relies on one of the three following technical steps:
  heating
  vacuum
  "stripping" with nitrogen or carbon dioxide
which are used alone or in combination, in order to achieve a final dissolved oxygen content which is lower than or equal to 0.05 mg/l at 10° C.

According to this technique of "stripping", a deoxygenating inert gas (nitrogen, carbon dioxide) is injected under pressure by means of injectors or ejectors into a liquid to be deoxygenated. Contact between inert gas and liquid is promoted either by a minimum length of contact duct in the first case, or by a Venturi system in the second case.

Thus, oxygen is displaced by means of dissolved nitrogen or carbon dioxide, and the mixture of $O_2$ and inert gas passes off during the decantation phase which takes place in a vat at atmospheric pressure. The process thus comprises one or two steps of injection enabling achieving the desired content of dissolved oxygen, which is 0.05 mg/l.

In the case of equipment operating in two steps, the consumption of nitrogen is 3.4 cubic meter of gas per cubic meter of liquid treated to go from 10 mg to 0.05 mg of dissolved oxygen per liter of treated liquid.

Although "stripping" with nitrogen gives excellent technical results, this procedure is economically uncompetitive with other techniques in particular deoxygenation under vacuum, since nitrogen consumption is quite high.

SUMMARY OF INVENTION

The present invention aims at a process for gas treatment of a product, of the type mentioned above, which intends to substantially reduce the consumption of inert gas, which is made possible by a relatively low investment. According to this object of the invention, the flow of gas which is produced by the treatment, at least partially undergoes a purification of said impurities in a separator of the adsorption or permeation type before being recycled as a treatment gas with addition of a compensating flow of gas predominantly containing an inert gas. Experience has indeed shown that the use of a low purity inert gas (containing less than 1% oxygen), which is substituted for a pure inert gas in the first step of a two step deoxygenation process is possible without resulting in an excessive consumption, and it has been established that three volumes of gas consisting of 99.5% inert gas such as nitrogen per volume of liquid treated enables achieving a concentration of dissolved oxygen of 0.4 mg/l. Possibly, a second step of "stripping" utilizing pure nitrogen such as so-called cryogenic nitrogen at a rate of 1.2 $m^3$ per $m^3$ of liquid treated, enables going from 0.5 mg/l of dissolved oxygen to 0.05 mg/l, in the case of an application of this process to nutritious liquids.

The preferred gas separator is a membrane generator which enables obtaining, for example starting from air, a gas which is considerably enriched in nitrogen at very low cost, but with an oxygen content which is still too high (5%) to permit achieving the first deoxygenation step. According to the invention, low purity nitrogen is not produced from ambient air, but from low purity nitrogen which is recovered at the outlet of the treatment enclosures. It is possible, then, to remove the oxygen introduced during the treatment resulting from gas removal (for example liquid) by means of the membrane permeator, as well as a nitrogen fraction.

According to a preferred embodiment of the process according to the invention, all the gas which is produced during the treatment undergoes said purification, while the compensating flow with a predominant content of inert gas, to be added, is equal to the flow of effluent gas obtained from said separation by adsorption or permeation.

The compensating gas flow predominantly containing an inert gas may be a high purity inert gas added to the flow of gas which is recycled upstream of the confined treatment zone and, possibly, this high purity inert gas is added to the flow of gas which is recycled in the treatment zone itself confined at a point of injection which is intermediate between the point of introduction of the recycling gas and the point of withdrawal of the gas which is produced by the treatment. The flow of compensating gas predominantly containing an inert gas may be low purity inert gas added to the gas which is recycled upstream of the purification step in the adsorption or permeation separator. According to a variant, the compensating flow predominantly containing an inert gas partly consists of a high purity inert gas added to the flow of gas which is recycled upstream of the confined treatment zone, and also partially contains a low purity or medium purity inert gas added to the gas which is recycled upstream of the purification step by adsorption or permeation separation. In this last embodiment, and as a variant, the compensating flow comprising a high purity inert gas is added to the flow of gas to be recycled at an intermediate point of injection between the point of introduction of the recycling gas and the point of withdrawal of the gas issued from the treatment.

The invention aims particularly, but not exclusively at the application of this process for the deoxygenation of liquids, in particular nutritious liquids. However, the invention is also applicable to all sorts of treatments utilizing an inert gas which, during the treatment, comes loaded with impurities extracted from the confined treatment zone, in particular heat treatment ovens, storage enclosures for electronic pieces, chambers for preserving equipment under controlled atmosphere, etc. . . in which an undesirable and/or polluting gas such as oxygen for example should be constantly withdrawn.

Equipment for practicing the process of the invention comprises at least a confined treatment enclosure with at least an inlet opening, and at least an outlet opening for withdrawing a gas, a gas feeding duct connected to said inlet feeding opening and a duct for withdrawing gas connected to said gas withdrawing outlet, which is characterized by a recycling gas connecting means between said feeding and withdrawing ducts, incorporating an adsorption or permeation gas separator with an upstream compressor, the equipment additionally comprising means for injecting a gas predominantly containing an inert gas. The means for injecting a gas predominantly containing an inert gas is a source of high purity inert gas connected upstream to the confined treatment enclosure, or connected between two treatment enclosures of a plurality of treatment enclosures connected in series. The means for introducing a gas predominantly containing an inert gas may be a source of high purity inert gas connected upstream of the enclosure which is located in the most downstream position among a series of treatment enclosures, but it is also possible that the means for introducing a gas predominantly containing an inert gas be a source of low purity or medium purity inert gas, connected to the duct for recycling respectively upstream or downstream of the separator of recycling gas and, preferably, the source of low purity inert gas is under a suitable pressure to be connected between separator and compressor. Steps may also be taken for the means of introducing a gas predominantly containing an inert gas to comprise a source of high purity inert gas connected upstream of the confined treatment enclosure and a source of low or medium purity recycling gas connected through the duct for recycling a recycling gas upstream or downstream respectively of the separator.

BRIEF DESCRIPTION OF DRAWING

The invention will now be described by way of illustration with reference to the annexed drawing, which is a schematic view of equipment for the deoxygenation of nutritious liquid.

DESCRIPTION OF PREFERRED EMBODIMENT

This equipment for the deoxygenation of nutritious liquid comprises two treatment enclosures, or vats for bubble removal or decantation 1 and 2 having a liquid feeding duct 3 opening into a gas-liquid mixer 4, which itself is supplied with purified nitrogen through a duct 5, the gas-liquid mixture circulating in a duct 6 before being injected through an opening 7 at the bottom of the upstream decantation vat 1. The introduction of a gas-liquid mixture may also be carried out by means of an upper zone, for example through the cover, by downwardly directing the jet which is introduced. From the vat 1, the liquid is withdrawn through an opening 8 towards a duct 9 leading to a second gas-liquid mix 10 which receives high purity nitrogen via a duct 11. The gas/liquid mixture or emulsion is sent through duct 12 to enter through an opening 13 at the bottom of the second decantation vat 2 (or at the top of said vat 2). The liquid which is finally treated is withdrawn through an opening 14 at the bottom of the vat towards a final withdrawal duct of deoxygenated liquid 15.

In both vats 1 and 2, the gases produced are collected in head portions 16 and 17 and are evacuated through openings 18 and 19 towards a gas withdrawal collector 20 which leads to the inlet compressor 21 for feeding a gas separator 22 of the membrane type 23 producing a gas containing about 99.5% nitrogen while the gas collected in head portions 16 and 17 of vats 1 and 2 comprises extracted impurities in an amount of about 1% to 5%, containing oxygen, carbon dioxide and water vapor, the amount of impurities determining the degree of purity of the inert gas. These impurities are substantially removed at 24 in the form of gas effluents downstream of membrane 23 of the permeator 22.

The added compensation flow may be completely ensured by the introduction of pure nitrogen at 11 into the mixer 10. It may partly or completely be ensured by an introduction of gas predominantly containing nitrogen with, however, impurities in non-negligible quantities, from 5 to 10% oxygen and even more (low purity nitrogen produced by a permeator or an adsorber) and, ultimately, it may be sufficient to introduce a flow of air which remains low. Depending on the available pressure, this low purity nitrogen gas is introduced at 25 into the low pressure collector 20 feeding compressor 21, or at 26 at the outlet of compressor 21, but upstream of separator 22.

If the compensating gas predominantly containing an inert gas is an inert gas which is less pure than the gas which issues from the treatment, it is added at 25, 26 to the gas to be recycled before separating the impurities by adsorption or permeation. If, on the other hand, the compensating gas predominantly containing an inert gas is a medium purity gas, whose purity is higher than that of the gas which issues from the treatment, it is added at 27 to the gas to be recycled after separation of the impurities by adsorption or permeation.

When utilizing air, the flow of air which is introduced into the permeator is adapted so as to have a ratio between the flow of low purity nitrogen and the flow of pure nitrogen, which corresponds to the requirements of the two-step deoxygenation to make sure that the system is equalized.

This equalizing of the system is obtained by overfeeding the membrane generator. The aim of overfeeding is to increase greatly the rate of recovery of the generator (flow of low purity nitrogen/flow of introduced air) but to the detriment of purity. By coupling overfeeding and recirculation, there is simultaneously obtained high yields of recovery and high purities.

EXAMPLE

A system of deoxygenation of 50 m$^3$/h of liquid containing 10 mg/l oxygen, and, under equilibrium conditions, has produced the following results:

| | flow | purity of nitrogen |
|---|---|---|
| permeator inlet (22) | 200 m$^3$/h | 99.6% |
| permeator outlet (22) (or first mixer inlet 4) | 150 m$^3$/h | 99.8% |
| pure nitrogen, at inlet of second mixer (10) | 50 m$^3$/h | 100% |

The system described, enables obtaining not only nitrogen more economically than by non-permeation (for a cost of production times 1.5, the production is multiplied by 4) but also a substantially higher level of purity (0.4-0.5% of oxygen) favoring its direct utilization in the first step of deoxygenation.

I claim:

1. A method for treating a product with a substantially inert treatment gas in at least first and second successive treatment chambers, which comprises the following steps:
   introducing the product to be treated into the first treatment chamber;
   causing the product to pass from the first treatment chamber to the second treatment chamber;
   introducing pure treatment gas into the product downstream of the first treatment chamber;
   withdrawing contaminated treatment gas from the first and second treatment chambers;
   purifying the contaminated treatment gas; and
   returning the purified treatment gas to the first treatment chamber.

2. The method of claim 1, wherein additional impure treatment gas is added to the withdrawn contaminated treatment gas before the purifying step.

3. The method of claim 2, wherein the purifying is achieved by adsorption or permeation separation.

4. The method of claim 1, wherein the product to be treated is liquid and wherein at least one of said pure treatment gas and said purified treatment gas is admixed in the liquid before introduction into a said treatment chamber.

5. The method of claim 4, wherein the liquid and gas mixture is introduced at the bottom of each treatment chamber and the contaminated treatment gas is withdrawn at the top of each treatment chamber.

6. A method for treating a liquid product with a treatment gas, which comprises the following steps:
   admixing treatment gas in a flow of product at a mixing station to form a first mixture;
   supplying said first mixture to a first treatment chamber;
   withdrawing product from the first treatment chamber;
   admixing pure treatment gas with the withdrawn product to form a second mixture;
   supplying said second mixture to a second treatment chamber; and
   withdrawing treated product from the second chamber,
   further comprising the steps of withdrawing from the first and second treatment chambers contaminated treatment gas and causing same to circulate through purification means back to said mixing station.

7. The method of claim 6, further comprising the step of introducing additional non-pure, non-contaminated treatment gas into the purification means.

8. The method of claim 6, wherein the purification means comprises a membrane separation station.

* * * * *